(12) United States Patent
Katsumata et al.

(10) Patent No.: US 11,573,103 B2
(45) Date of Patent: Feb. 7, 2023

(54) ANGLE DETECTOR

(71) Applicant: SANKYO SEISAKUSHO CO., Tokyo (JP)

(72) Inventors: Kazuhisa Katsumata, Kikugawa (JP); Naoyuki Takahashi, Kikugawa (JP)

(73) Assignee: SANKYO SEISAKUSHO CO., Tokyo (JP)

( * ) Notice: Subject to any disclaimer, the term of this patent is extended or adjusted under 35 U.S.C. 154(b) by 296 days.

(21) Appl. No.: 16/760,835

(22) PCT Filed: Apr. 25, 2019

(86) PCT No.: PCT/JP2019/017642
§ 371 (c)(1),
(2) Date: Apr. 30, 2020

(87) PCT Pub. No.: WO2019/216235
PCT Pub. Date: Nov. 14, 2019

(65) Prior Publication Data
US 2021/0215512 A1 Jul. 15, 2021

(30) Foreign Application Priority Data
May 11, 2018 (JP) .............................. JP2018-092021

(51) Int. Cl.
*G01D 5/245* (2006.01)
*G01D 5/244* (2006.01)
(52) U.S. Cl.
CPC ......... *G01D 5/245* (2013.01); *G01D 5/24471* (2013.01)
(58) Field of Classification Search
CPC ...... G01B 7/30; G01D 5/145; G01D 5/24471; G01D 5/245; G01D 5/2451; G01D 5/2497
See application file for complete search history.

(56) References Cited

U.S. PATENT DOCUMENTS 6,433,536 B1  8/2002  Yundt et al.
8,368,393 B2 *  2/2013  Zangl ..................... G06F 3/046
                                                    324/207.25
(Continued)

FOREIGN PATENT DOCUMENTS

CN    102341674 A    2/2012
CN    102538837 A    7/2012
(Continued)

OTHER PUBLICATIONS

International Search Report with English translation dated Mar. 10, 2020 in corresponding Application No. TW 108115245.
(Continued)

*Primary Examiner* — Steven L Yeninas
(74) *Attorney, Agent, or Firm* — Harness, Dickey & Pierce, P.L.C.

(57) ABSTRACT

An angle detector for detecting an amount of angular change due to the rotation of a rotary body. The angle detector is provided with a rotary body rotating around a rotation axis, a graduated scale having a plurality of graduations along the circumference of the rotary body in a rotation direction, and a plurality of sensors disposed along the circumference. Each of the sensors outputs a signal according to an amount of angular change on the basis of the plurality of graduations. The output signal includes a fundamental wave component having one of the plurality of graduations as a first period first order, and a harmonic wave component having an order that is an integer multiple of at least two times the fundamental wave component. An amount of angular displacement calculated from the output signal includes an angular error component that is due to the harmonic wave component and has an order component that is an integer multiple of the one graduation that is the first period first order. The number of the plurality of sensors is determined on the basis of the number of graduations on the graduated (Continued)

scale and the order component of the angular error component.

9 Claims, 13 Drawing Sheets

(56) References Cited

U.S. PATENT DOCUMENTS

| | | | | |
|---|---|---|---|---|
| 2009/0115409 | A1* | 5/2009 | Arinaga | G01D 5/145 324/207.25 |
| 2012/0025812 | A1 | 2/2012 | Dolsak | |
| 2012/0151987 | A1 | 6/2012 | Kanamori | |
| 2013/0200885 | A1* | 8/2013 | Asano | G01B 7/30 324/207.21 |
| 2014/0285184 | A1* | 9/2014 | Ahn | G01B 7/14 324/207.13 |
| 2019/0041240 | A1* | 2/2019 | Kuwahara | G01D 5/24471 |

FOREIGN PATENT DOCUMENTS

| | | |
|---|---|---|
| EP | 2404141 A1 | 1/2012 |
| EP | 2498066 A2 | 9/2012 |
| JP | S60170710 A | 9/1985 |
| JP | 2005214920 A | 8/2005 |
| JP | 200698392 A | 4/2006 |
| JP | 2006112862 A | 4/2006 |
| JP | 2008304249 A | 12/2008 |
| JP | 201199802 A | 5/2011 |
| JP | 201199804 A | 5/2011 |
| JP | 2012132714 A | 7/2012 |
| JP | 2012519296 A | 8/2012 |
| JP | 2016118491 A | 6/2016 |
| WO | WO-2017/068684 A1 | 4/2017 |

OTHER PUBLICATIONS

Office Action dated Apr. 7, 2020 corresponding to Application No. TW 108115245 with English translation.
Office Action dated Dec. 2, 2021 in corresponding Application No. CN 201980003659.3 with English translation.
International Search Report (in English and Japanese) and Written Opinion of the International Searching Authority (in Japanese) issued in PCT/JP20180/017642, dated Jul. 2, 2019; ISA/JP.
Extended European Search Report dated Jan. 13, 2022 from corresponding European Patent Application No. 19800161.2.
Office Action dated Nov. 15, 2022 in corresponding Application No. JP 2020-518258 with English translation.

\* cited by examiner

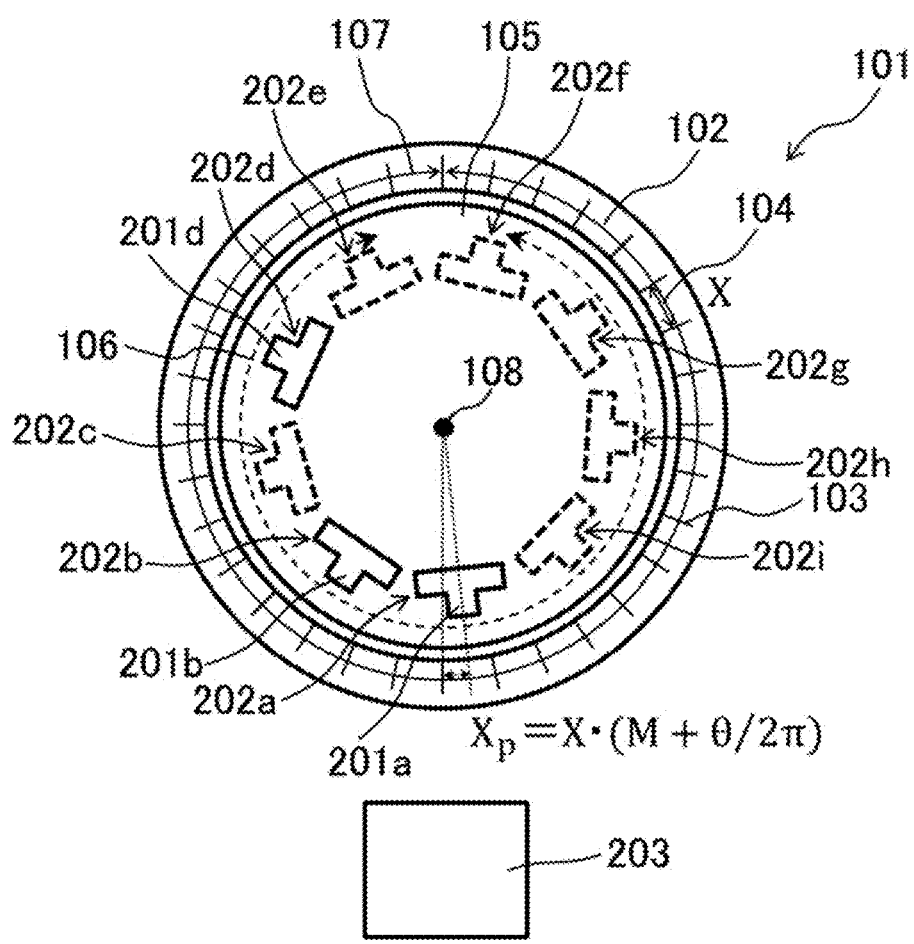

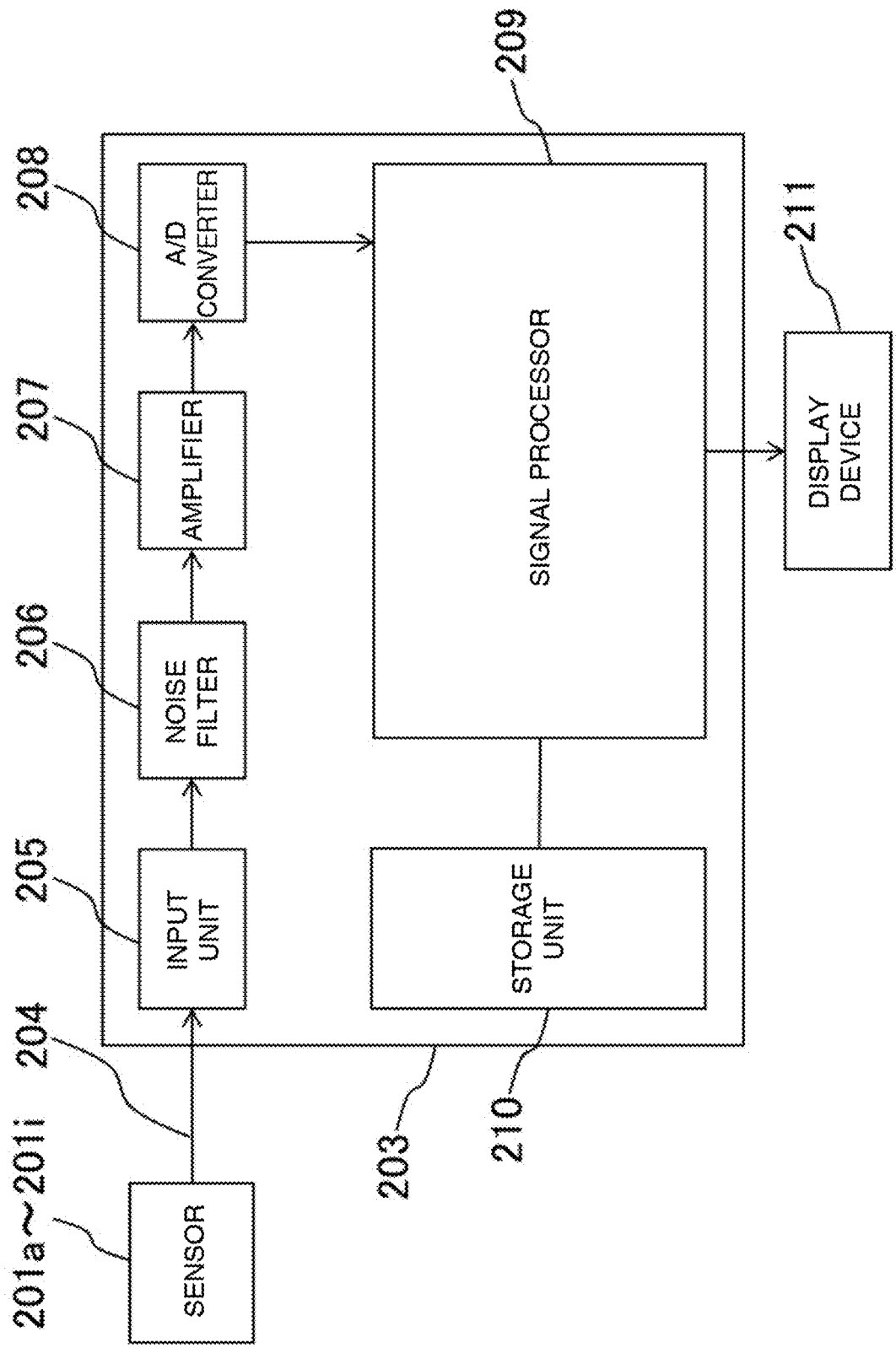

FIG. 5A

| ORDER OF ANGLE ERROR COMPONENT IN SINGLE GRADUATION: p | ORDER OF ELECTRICAL ANGLE ERROR ON CIRCUMFERENCE OF SCALE: $N_p$ | NUMBER OF PLANNED SENSOR LOCATIONS | | | | |
|---|---|---|---|---|---|---|
| | | 5 | 6 | 7 | 8 | 9 |
| 1 | 256 | ○ | ○ | ○ | × | ○ |
| 2 | 512 | ○ | ○ | ○ | × | ○ |
| 3 | 768 | ○ | × | ○ | × | ○ |
| 4 | 1024 | × | ○ | ○ | × | ○ |
| 5 | 1280 | ○ | ○ | × | × | ○ |
| 6 | 1536 | ○ | × | ○ | × | ○ |
| 7 | 1792 | ○ | ○ | ○ | × | ○ |
| 8 | 2048 | ○ | × | ○ | × | × |
| 9 | 2304 | × | ○ | ○ | × | ○ |
| 10 | 2560 | | | | | |
| THE NUMBER OF ○ | | 8 | 7 | 9 | 0 | 9 |

FIG. 5B

| ORDER OF ANGLE ERROR COMPONENT IN SINGLE GRADUATION: p | ORDER OF ELECTRICAL ANGLE ERROR ON CIRCUMFERENCE OF SCALE: $N_p$ | NUMBER OF PLANNED SENSOR LOCATIONS | | | | |
|---|---|---|---|---|---|---|
| | | 5 | 6 | 7 | 8 | 9 |
| 1 | 256 | × | ○ | ○ | × | ○ |
| 2 | 512 | ○ | ○ | × | × | ◎ |
| 3 | 768 | ○ | × | ◎ | × | ○ |
| 4 | 1024 | ◎ | ○ | × | × | ◎ |
| 5 | 1280 | × | ○ | ◎ | × | × |
| 6 | 1536 | ○ | ○ | ○ | × | ○ |
| 7 | 1792 | ○ | × | × | × | × |
| 8 | 2048 | ◎ | ○ | ○ | × | ○ |
| 9 | 2304 | × | × | × | × | × |
| 10 | 2560 | × | ○ | ◎ | × | ○ |
| THE NUMBER OF ○ | | 4 | 7 | 3 | 0 | 5 |
| THE NUMBER OF ◎ | | 2 | 0 | 3 | 0 | 2 |
| TOTAL SCORE | | 8 | 7 | 9 | 0 | 9 |

FIG. 5C

| ORDER OF ANGLE ERROR COMPONENT IN SINGLE GRADUATION: p | ORDER OF ELECTRICAL ANGLE ERROR ON CIRCUMFERENCE OF SCALE: $N_p$ | THE NUMBER OF GRADUATIONS: N | | | | | |
|---|---|---|---|---|---|---|---|
| | | 254 | 255 | 256 | 257 | 258 | 259 |
| 1 | p × THE NUMBER OF GRADUATIONS: N | ◎ | × | × | ○ | ○ | ◎ |
| 2 | | ○ | × | ○ | ◎ | × | ○ |
| 3 | | ○ | × | ○ | × | ◎ | ○ |
| 4 | | × | × | ◎ | ○ | ○ | × |
| 5 | | × | × | × | × | × | × |
| 6 | | ◎ | × | × | ○ | ○ | ◎ |
| 7 | | ○ | × | ○ | ◎ | × | ○ |
| 8 | | ○ | × | ○ | × | ◎ | ○ |
| 9 | | × | × | × | ○ | ○ | × |
| 10 | | × | × | × | × | × | × |
| THE NUMBER OF ○ | | 4 | 0 | 4 | 4 | 4 | 4 |
| THE NUMBER OF ◎ | | 2 | 0 | 2 | 2 | 2 | 2 |
| TOTAL SCORE | | 8 | 0 | 8 | 8 | 8 | 8 |

COMMAND ANGLE OF ROTARY BODY [deg]

POSITION DERIVED FROM CONVERTING COMMAND ANGLE OF ROTARY BODY INTO GRADUATION

POSITION DERIVED FROM CONVERTING COMMAND
ANGLE OF ROTARY BODY INTO GRADUATION

ANGLE ERROR ORDER ON CIRCUMFERENCE
OF ROTARY BODY CORRESPONDING
TO FIRST ORDER OF ONE CYCLE

ANGLE DETECTOR

CROSS REFERENCE TO RELATED APPLICATIONS

This application is a U.S. National Phase Application under 35 U.S.C. 371 of International Application No. PCT/JP2019/017642 filed on Apr. 25, 2019, which claims the benefit of priority from Japanese Patent Application No. 2018-092021 filed on May 11, 2018. The entire disclosures of all of the above applications are incorporated herein by reference.

TECHNICAL FIELD

The present invention relates to an angle detector for detecting an angle change amount of a rotary body in rotary motion.

BACKGROUND ART

The angle detector, for example, an encoder, a resolver, an inductosyn and the like has been used for detecting the angle change amount of the rotary body in rotary motion. The angle detector includes a scale with multiple graduations, a sensor for reading the multiple graduations, and a controller for converting the read information from the sensor into the angle change amount of the rotary body. The rotary body is provided with either the scale or the sensor. The angle change amount of the rotary body may be read with higher resolving power by narrowing an angle interval of the single graduation of the scale. However, as the graduation is formed in such process as engraving, it is impossible to make the infinitely fine graduation. In order to measure the angle change amount of the rotary body in more detail, there has been proposed the method of finely dividing the single graduation by allowing the controller to execute an arithmetic operation of the output signal based on the read information from the sensor. Normally, the output signal from the sensor used for the angle detector has a shape of rectangular wave or sine wave. In the above-described case, the signal has two phases different by an amount corresponding to 90° under the condition where the single graduation corresponds to a cycle of 360°. In the case of the sinusoidal signal as the output signal from the sensor, the two-phase signal has a shape of cos θ, sin θ, in one cycle corresponding to the single graduation. For example, the method of executing the inverse tangent arithmetic operation of the two-phase signal (that is, $\theta=\tan^{-1}(\sin\theta/\cos\theta)$ may be used as the one for dividing the single graduation. The method allows improvement in the angular resolution in accordance with the detection resolving power of the amplitude of the output signal from the sensor. The output signal from the sensor contains harmonic component distortion besides the ideal sinusoidal signal in one cycle corresponding to the single graduation. The resultant measurement includes not only the actual angle change amount of the rotary body but also a certain amount irrelevant to the actual angle change amount in accordance with the harmonic component distortion. That is, an error (angle error) irrelevant to the actual angle change amount occurs under the influence of the harmonic component between the actual value of the angle change amount of the rotary body in rotation based on a command, and the measured angle change amount obtained by converting the sensor output signal by the controller. In order to measure the actual angle change amount and the angle error, the harmonic component distortion contained in the output signal from the sensor has to be removed.

Preferably, the angle detector is configured to coaxially arrange the rotary axis of the rotary body and the center axis of the scale. Generally, however, those axes do not coincide with each other completely. The axial offset (axial eccentricity) causes the angle error between the actual angle change amount of the rotary body in rotation based on the command, and the measured angle change amount obtained by converting the sensor output signal by the controller. As the graduation of the scale is formed in such process as engraving, quality problems may occur, for example, offset between the center of the graduation pattern and the rotation center itself of the graduation scale, and an interval error of the single graduation to the ideal value to cause unevenness among multiple graduations. Additionally, degradation of components of the angle detector causes secular change of the detection accuracy of the angle detector itself. From the above-described circumstances, the angle error occurs between the actual angle change amount of the rotary body in rotation, and the measured angle change amount obtained by converting the sensor output signal by the controller.

Patent literature 1 discloses the method of detecting the third-order harmonic component distortion contained in the two-phase sinusoidal signal having different phases by the amount corresponding to 90°, and removing the detected distortion. Patent literature 2 discloses the method of detecting the third-order and fifth-order harmonic component distortions contained in the two-phase sinusoidal signal with different phases by the amount corresponding to 90°.

Patent literatures 3 to 5 disclose the angle detector including multiple first graduation reading heads around the scale plate fixed to the rotary axis, and a single second graduation reading head. The angle detector obtains a difference $SA_{i,j}$ between the angular signal $A_{i,1}$ of the second graduation reading head, and each angular signal $A_{i,j}$ of the respective first graduation reading heads, and further obtains an average value $SAV_i$ so that self-calibration is performed. In the disclosure, the code i denotes the number of graduations (integer from 1 to NG, NG is a total number of the graduations), and j denotes the number of the graduation reading heads (integer from 1 to $N_H$, $N_H$ is a total number of the graduation reading heads).

$$SA_{i,k} = A_{i,1} - A_{i,j} \qquad [\text{MATH 1}]$$

$$SAV_i = \frac{1}{N_H} \sum_{j=1}^{N_H} SA_{i,j}$$

CITATION LIST

Patent Literature

PTL 1: Japanese Patent Laid-Open No. 2006-112862
PTL 2: Japanese Patent Laid-Open No. 2008-304249
PTL 3: Japanese Patent Laid-Open No. 2006-98392
PTL 4: Japanese Patent Laid-Open No. 2011-99802
PTL 5: Japanese Patent Laid-Open No. 2011-99804

SUMMARY OF INVENTION

Technical Problem

In the patent literatures 1, 2, the electrical angle error caused by the specific harmonic component distortion owing to the sensor may be detected and removed. However, the output signal from the sensor contains various harmonic component distortions owing to, for example, accuracy of the graduation, characteristic and type of the sensor and the like. Detection only of the specific harmonic component distortion is insufficient for various sensors to remove the harmonic component distortion uniformly. For example, the characteristic of distortion owing to the sensor may become different depending on the reading type of the sensor, for example, optical reading type and magnetic reading type. The characteristic of distortion may further become totally different depending on the graduation to be read, for example, the magnetizing ring and the gear even in the case of using the magnetic reading type. When using such device as the amplifier for amplifying the output signal from the sensor, the harmonic component distortion may occur owing to characteristics of the device. The harmonic component distortion which can be removed in a certain condition is not always removable in another condition.

In the patent literatures 3 to 5, the angle detector is capable of detecting a mechanical angle error owing to the axial eccentricity between the rotary axis of the rotary body and the center axis of the scale, quality of the scale, secular change of the angle detector and the like, and removing the detected error. In order to obtain the angle change amount of the rotary body highly accurately using the above-described method, it is effective for narrowing the angle interval of the single graduation, and using the highly accurate graduation reading head. The resultant angle detector, however, is likely to become highly costed. When using the scale with graduations at wider intervals, and the graduation reading head with low accuracy for cost reduction, the harmonic component contained in the signal output from the graduation reading head becomes increasingly influential to the electrical angle error. This appears as the error more dominant than the mechanical angle error. Accordingly, the angle change amount of the rotary body cannot be obtained highly accurately.

It is an object of the present invention to provide an angle detector which obtains the angle change amount of the rotary body highly accurately by removing the electrical angle error owing to the sensor simultaneously with the mechanical angle error owing to an attachment accuracy of the rotary body, quality of the scale, secular change of the angle detector, and allows cost reduction.

Solution to Problem

According to an aspect of the present invention, an angle detector including a rotary body rotating around a rotary axis, a scale with multiple graduations along a circumference of the rotary body in a rotating direction, and at least two sensors disposed along the circumference of the rotary body in the rotating direction detects an angle change amount of the rotary body in rotation. Each of at least two sensors outputs a signal in accordance with the angle change amount based on the multiple graduations. The output signal contains a fundamental wave component where one graduation of the multiple graduations is set as a first order of one cycle, and a harmonic component where two or more integer multiples of the fundamental wave component is set as an order. The angle change amount calculated from the output signal contains at least one angle error component having an order component of one or more of an integer multiple of the one graduation set as the first order of one cycle owing to the harmonic component. The number of at least two sensors is determined based on the number of the graduations of the scale, and the order component of at least one angle error component.

In a specific example of the angle detector according to the present invention, at least one angle error component corresponds to multiple angle error components. The number of at least two sensors is determined based on the number of the graduations of the scale, and each order component of the multiple angle error components.

In a specific example of the angle detector according to the present invention, the number of at least two sensors is determined based on an integer incapable of dividing a product of the number of the graduations of the scale and one or more integer being the order component of at least one angle error component.

In a specific example of the angle detector according to the present invention, the number of at least two sensors is further determined based on a remainder derived from dividing the product of the number of the graduations of the scale and the order component of the angle error component by the integer incapable of dividing the product.

In a specific example of the angle detector according to the present invention, the number of at least two sensors is further determined based on a weighting in accordance with the remainder derived from dividing the product of the number of the graduations of the scale and the order component of the angle error component by the integer incapable of dividing the product.

In a specific example of the angle detector according to the present invention, planned sensor locations by the number that coincides with the integer incapable of dividing the product are set along the circumference of the rotary body in a rotating direction at substantially equal intervals, and the at least two sensors are disposed one by one at any of the planned sensor locations.

In a specific example of the angle detector according to the present invention, two of at least two sensors are disposed one by one at adjacent two of the planned sensor locations.

In a specific example of the angle detector according to the present invention, each one of at least two sensors is disposed one by one at each one of the planned sensor locations.

In a specific example of the angle detector according to the present invention, at least one angle error component differs depending on a type of at least two sensors.

In a specific example of the angle detector according to the present invention, self-calibration is performed by obtaining an output signal difference between the output signal from one of at least two sensors and the output signal from the other sensor.

Advantageous Effect of Invention

According to the present invention, the angle detector obtains the angle change amount of the rotary body highly accurately by removing the electrical angle error owing to the distortion contained in the output signal from the sensor simultaneously with the mechanical angle error owing to the attachment accuracy of the rotary body, quality of the graduation scale, secular change of the angle detector and the like. The angle detector is capable of highly accurately obtaining the angle change amount of the rotary body uniformly irrespective of the sensor. In the present invention, the inexpensive sensor with low accuracy may be used to markedly improve accuracy of the angle change amount of the rotary body. It is therefore possible to reduce the cost for the angle detector with no need of using the conventional highly accurate sensor which is highly costed.

Other objects, features and advantages of the present invention will become apparent from the following description of the embodiments of the present invention taken in conjunction with the accompanying drawings.

BRIEF DESCRIPTION OF DRAWINGS

FIG. 2A is a view schematically showing an angle detector according to another embodiment of the present invention for detecting an angle change amount of a rotary body to which at least two sensors are attached.

FIG. 3 schematically shows a controller of the angle detector as shown in FIGS. 1A to 2B.

FIG. 5A is a table showing determination results based on divisibility/indivisibility resulting from dividing the angle error order on a circumference of the scale by the number of planned sensor locations in the condition where the number of graduations is kept constant.

FIG. 5B is a table showing determination results based on a weighting in accordance with a remainder of the division of the angle error order on the circumference of the scale by the number of planned sensor locations in the condition where the number of graduations is kept constant.

FIG. 5C is a table showing determination results based on the weighting in accordance with the remainder of the division of the angle error order on the circumference of the scale by the number of planned sensor locations in the condition where the number of planned sensor locations is kept constant.

FIG. 6A shows an angle error to a command angle of the rotary body before removing the electrical angle error owing to the sensor and the mechanical angle error owing to the attachment accuracy of the rotary body and the like.

FIG. 7A shows an angle error to the command angle of the rotary body after removing the electrical angle error owing to the sensor and the mechanical angle error owing to the attachment accuracy of the rotary body and the like.

DESCRIPTION OF EMBODIMENTS

Figure 1A:
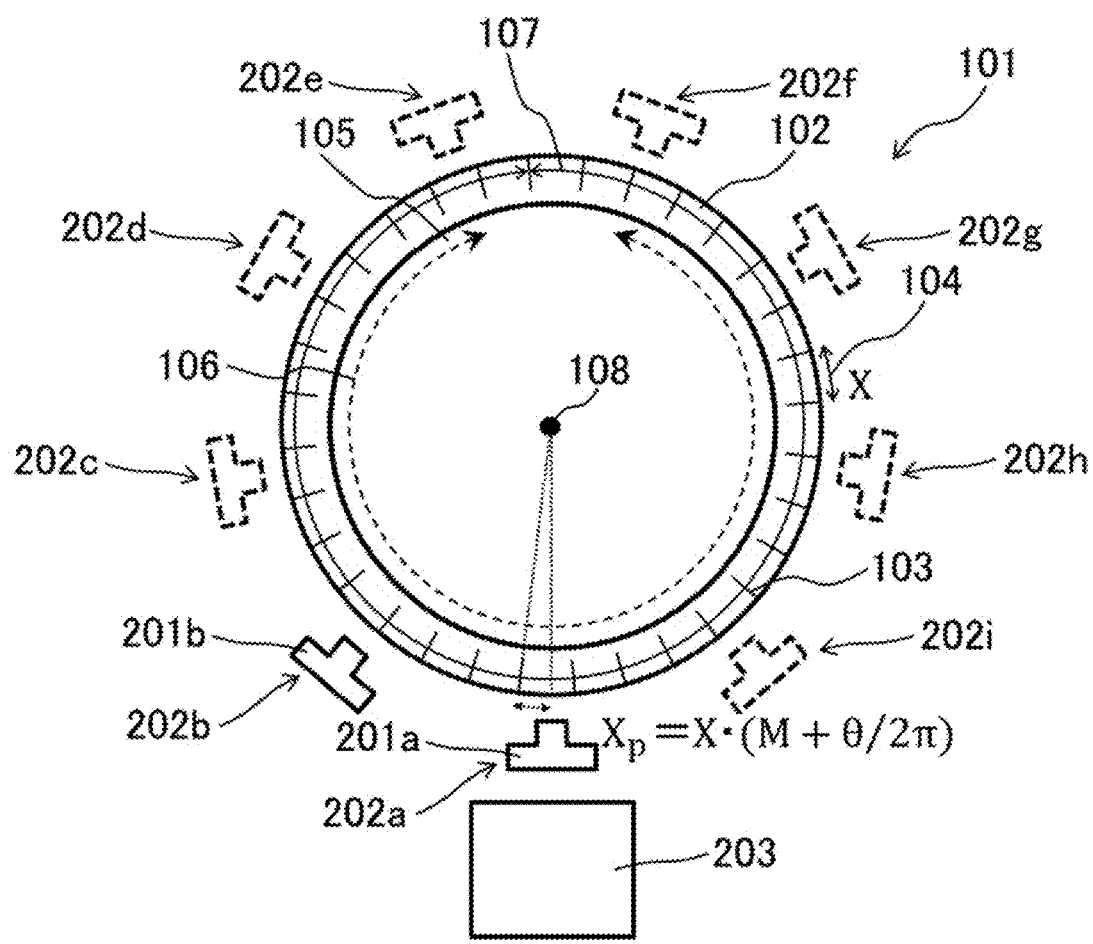
FIG. 1A is a view schematically showing an angle detector according to an embodiment of the present invention for detecting an angle change amount of a rotary body to which a scale is attached.

Embodiments according to the present invention will be described referring to the drawings. The present invention is not limited to those embodiments.

FIGS. 1A to 2B show an angle detector 101 including a rotary body 105 rotating around a rotary axis 108, a scale 102 with multiple graduations 103 along a circumference in a rotating direction 106 of the rotary body 105, and at least two of sensors 201a to 201i disposed at planned sensor locations 202a to 202i along the rotating direction 106 of the rotary body 105. The graduation 103 of the scale 102 is actually formed by executing the engraving process to the scale 102 for visual recognition. However, the graduation may be arbitrarily formed so long as a predetermined positional interval on the scale 102 is read by the sensors 201a to 201i as the single graduation interval. The scale 102 is a member on which the multiple graduations 103 are arranged as described above. The encoder, the resolver, the inductosyn and the like are typically employed for the angle detector 101. However, the principle of the angle detector 101 is not restricted so long as the present invention is applicable. Also, the principle of the sensors 201a to 201i is not specifically restricted so long as the graduations 103 of the scale 102 can be read. The optical sensor, the magnetic sensor, the coil and the like may be employed for the sensors 201a to 201i. The scale 102 may be arbitrarily formed so long as the sensors 201a to 201i can read the graduations 103 irrelevant to the material, the method of arranging the graduations 103 and the like. The sensors 201a to 201i are arranged on a circumference 107 in the rotating direction 106 of the rotary body 105, that is, at the planned sensor locations 202a to 202i on an entire circumference. The angle detector 101 detects an angle change amount $X_p$ of the rotary body 105 in rotation based on the output signals from the sensors 201a to 201i using the multiple graduations 103 arranged along the rotating direction 106. Each of the sensors 201a to 201i outputs a signal 204 in accordance with the angle change amount of the rotary body 105 in rotation based on the multiple graduations 103. A width between two adjacent graduations 103, that is, the angle interval 104 of the single graduation is designated as X.

Figure 1B:
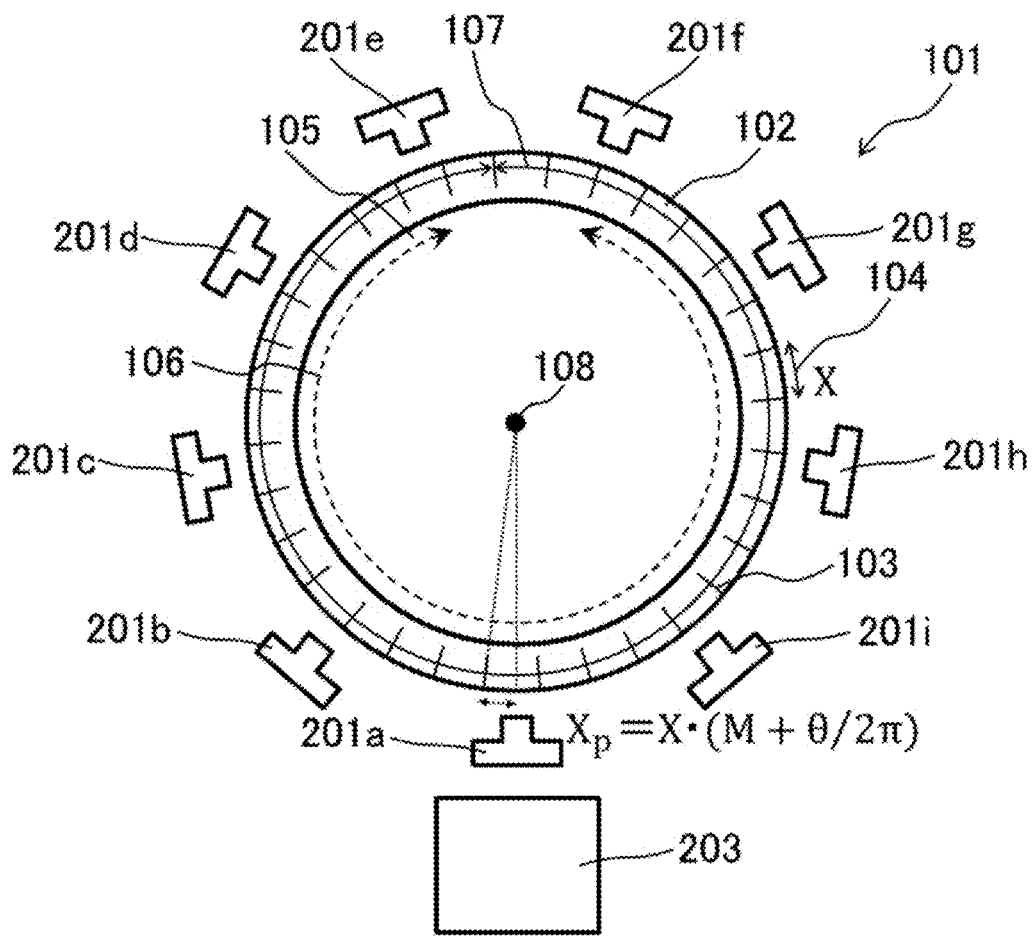
FIG. 1B is a view schematically showing an angle detector according to another embodiment of the present invention for detecting an angle change amount of a rotary body to which a scale is attached.
Figure 2B:
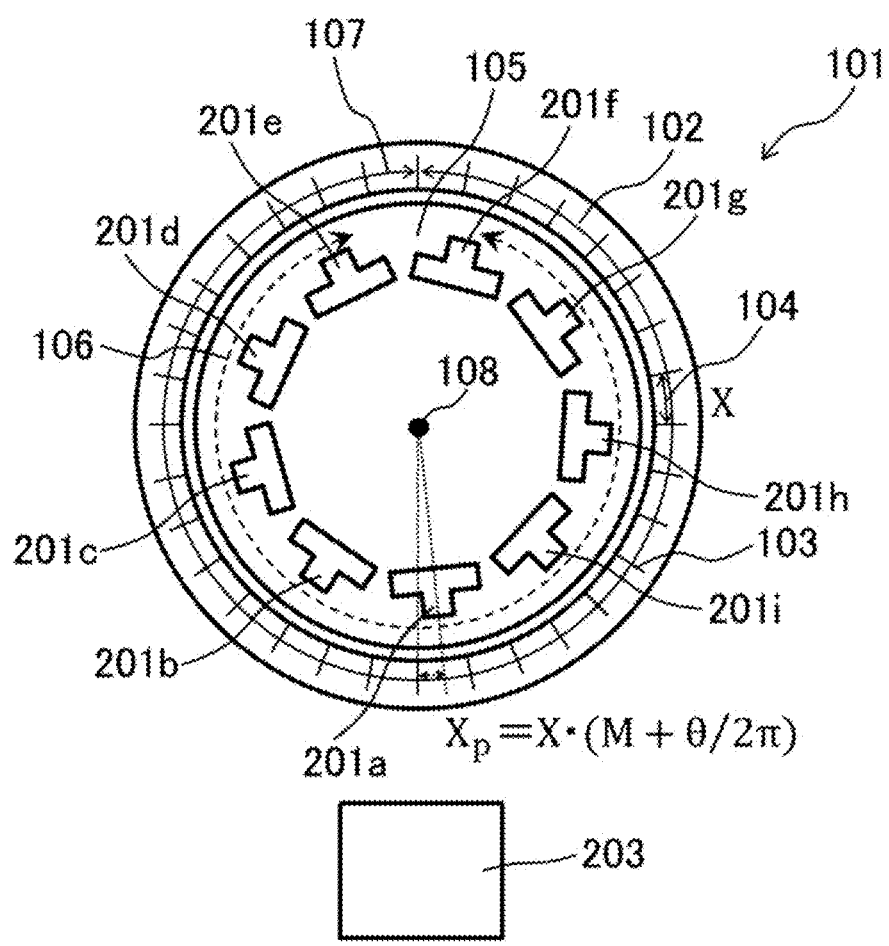
FIG. 2B is a view schematically showing an angle detector according to another embodiment of the present invention for detecting an angle change amount of a rotary body to which at least two sensors are attached.

FIG. 1A shows the angle detector 101 having two sensors 201a, 201b disposed along the circumference 107 of the rotary body 105 for detecting the angle change amount $X_p$ of the rotary body 105 to which the scale 102 is attached, which rotates along the rotating direction 106. FIG. 1B shows the angle detector 101 having nine sensors 201a to 201i disposed along the circumference 107 of the rotary body 105 for detecting the angle change amount $X_p$ of the rotary body 105 to which the scale 102 is attached, which rotates along the rotating direction 106. FIG. 2A shows the angle detector 101 having three sensors 201a, 201b, 201d disposed along the circumference 107 of the rotary body 105 for detecting the angle change amount $X_p$ of the rotary body 105 to which the three sensors 201a, 201b, 201d are attached, which rotates along the rotating direction 106. FIG. 2B shows the angle detector 101 having nine sensors 201a to 201i disposed along the circumference 107 of the rotary body 105 for detecting the angle change amount $X_p$ of the rotary body 105 to which the nine sensors 201a to 201i are attached, which rotates along the rotating direction 106.

As FIG. 3 shows, the angle detector 101 further includes a controller 203 connected to the sensors 201a to 201i to convert the information read by the sensors 201a to 201i into the angle change amount $X_p$ of the rotary body 105. The converted angle change amount $X_p$ may be output to a display device 211 and the like, or transmitted to the motor for driving the rotary body 105, the control unit of the rotary body 105 and the like as feedback.

Generally, when the sensors 201a to 201i are brought into motion relative to the scale 102, based on the read graduation 103 and the angle interval 104 of the single graduation, the sensors 201a to 201i are capable of outputting the output signal 204 having the amplitude variable in accordance with the angle change amount in the condition where the single graduation of the multiple graduations 103 corresponds to the first order of one cycle. The controller 203 is capable of converting the information into the angle change amount $X_p$ of the rotary body 105 using the output signals 204 from the sensors 201a to 201i, and a number of detected graduations M counted up to a certain time. As FIGS. 1A to 2B show, if the relative motion between the scale 102 and the sensors 201a to 201i allows those sensors 201a to 201i to output the output signals 204 in the form of two pseudo sinusoidal signals (a phase-A signal ($A^{(0)}$) and a phase-B signal ($B^{(0)}$)), phases of which are different by an amount corresponding to 90° as shown in FIG. 5A, the controller 203 acquires the pseudo sinusoidal signals output from the sensors 201a to 201i. One of the pseudo sinusoidal signals output from the sensors 201a to 201i, having the phase in the delay angle side (the phase-B signal ($B^{(0)}$)) is divided by the other pseudo sinusoidal signal (the phase-A signal ($A^{(0)}$)). The obtained value is then subjected to the inverse tangent arithmetic operation to divide the single graduation so that a temporary angle change amount $X_p^{(0)}$ of the rotary body 105 is calculated.

$$X_p(0) = X + \left(M + \frac{\theta^{(0)}}{2\pi}\right) = X + \left(M + \tan^{-1}\left(\frac{B^{(0)}}{A^{(0)}}\right)\right)/2\pi \quad \text{[MATH 2]}$$

where $\theta^{(0)}=\tan^{-1}(B^{(0)}/A^{(0)})$ is numerically processed to be in a range from 0 to 2n. The number of detected graduations M may be detected by executing the processing, for example, incrementing or decrementing the count value at a timing when the $\theta^{(0)}=\tan^{-1}(B^{(0)}/A^{(0)})$ exceeds over the boundaries of 0 and $2\pi$ using an arbitrary method. Referring to FIGS. 1A to 2B, when rotating the rotary body 105 provided with either the scale 102 or the sensors 201a to 201i, the controller 203 is capable of calculating the angle change amount $X_p$ of the rotary body 105 in rotation.

Figure 4A:
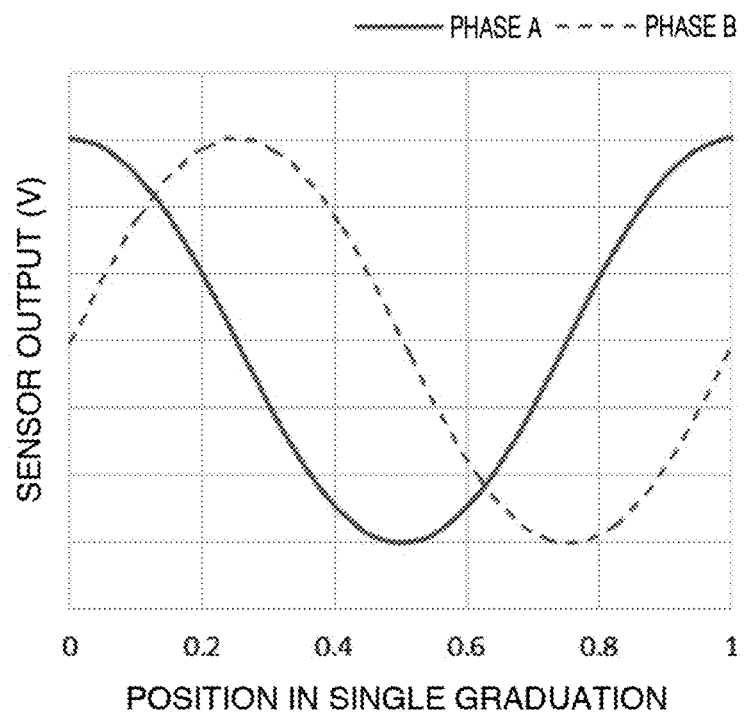
FIG. 4A shows a pseudo sinusoidal signal to be output when a sensor detects a position in a single graduation.
Figure 4B:
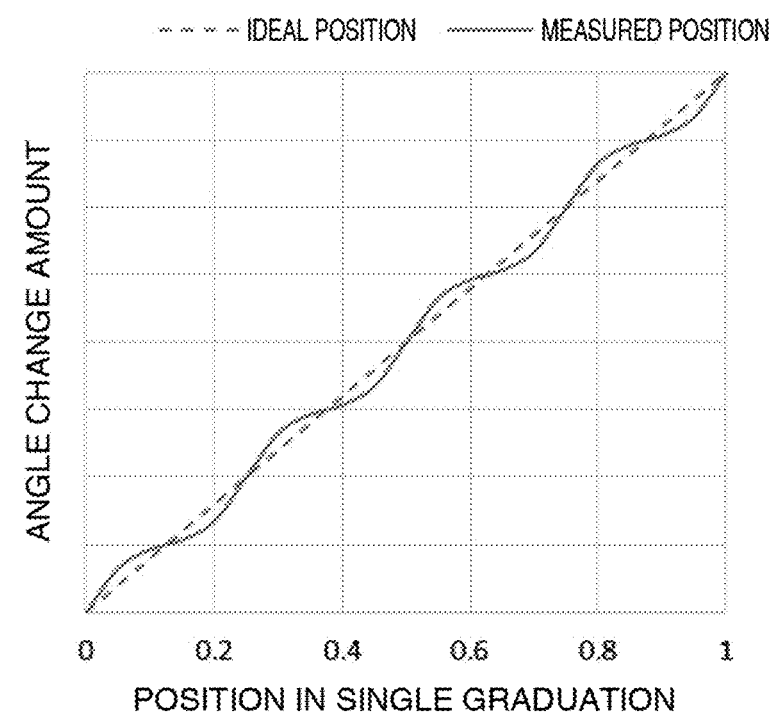
FIG. 4B shows a measured angle and an ideal angle to the position in the single graduation, which have been calculated from the pseudo sinusoidal signal as shown in FIG. 4A.
Figure 4C:
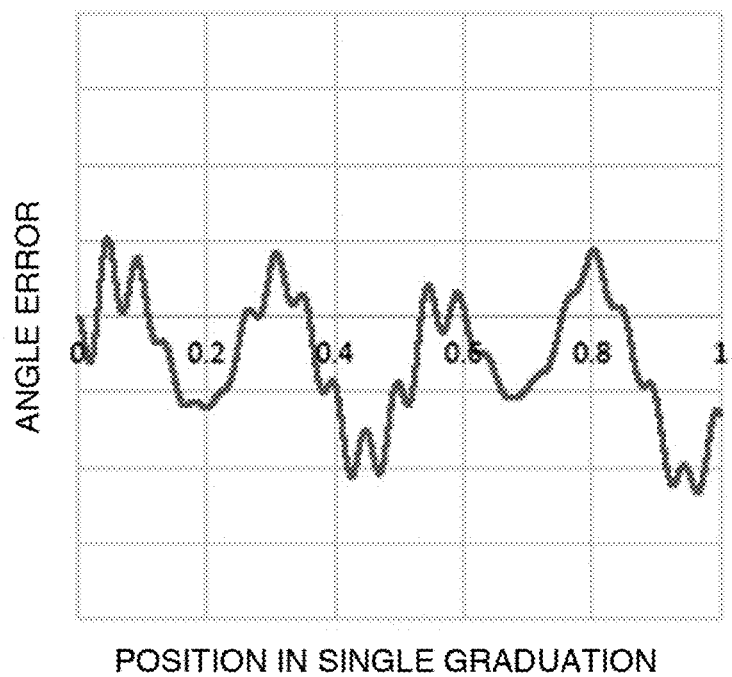
FIG. 4C shows an angle error between the measured angle and the ideal angle to the position in the single graduation, which have been calculated from the pseudo sinusoidal signal as shown in FIG. 4A.

However, an error occurs between the calculated temporary angle change amount $X_p^{(0)}$ and an ideal angle change amount $X_{pideal}$ of the rotary body 105 to be derived from the angle detector 101 (ideally, $X_p=X_{pideal}$). In the condition where the rotary body 105 as shown in FIGS. 1A to 2B is rotating at constant speeds, and the rotation command is received to change the angle of the rotary body 105, it is assumed that, ideally, the rotary body 105 is rotatable without causing the error to the command value as shown in FIG. 4B. On the assumption as described above, as the angle of the rotary body 105 is increased in rotary motion of the rotary body 105, the angle change amount $X_p$ calculated from the output signal 204 from the sensors 201a to 201i will linearly increase. Consequently, the angle error hardly occurs between the angle of the rotary body 105 and the ideal angle change amount $X_{pideal}$. Actually, however, the angle error exists between the angle change amount $X_p$ calculated from the output signal 204 from the sensors 201a to 201i, and the ideal angle change amount $X_{pideal}$. Possible causes of the angle error include the surplus amount (referred to as the mechanical angle error) contained in the calculated angle change amount $X_p$ owing to the axial eccentricity between the rotary axis 108 of the rotary body 105 and the center axis of the scale 102, the quality of the scale 102, the secular change of the angle detector 101 and the like in the course of detecting the multiple graduations 103 as the rotary body 105 rotates, and an additional distortion contained in the output signal 204 owing to characteristics of the sensors 201a to 201i (the angle error owing to the characteristics of the sensors 201a to 201i will be referred to as the electrical angle error). More specifically, the cause of the electrical angle error owing to the sensors 201a to 201i is that the output signal from the sensors 201a to 201i contains a fundamental wave component having the single graduation of the multiple graduations 103 corresponding to the first order of one cycle, and the harmonic component having two or more integer multiples of the fundamental wave component as the order. For example, if the sensors 201a to 201i output the two pseudo sinusoidal signals having phases different from each other by an amount corresponding to 90° as shown in FIG. 4A (the phase-A signal ($A^{(0)}$) and the phase-B signal ($B^{(0)}$)) as the output signals 204, the two pseudo sinusoidal signals output from the sensors 201a to 201i include the ideal fundamental wave components $\cos(\theta)$, $\sin(\theta)$ having the single graduation of the multiple graduations 103 corresponding to the first order of one cycle, and the harmonic component having two or more integer multiples of the fundamental wave component as the order (the component when the order k is an integer equal to or more than 2). The harmonic component of the sensors 201a to 201i may significantly affect the angle change amount $X_p$ upon execution of the inverse tangent arithmetic operation as indicated by the [MATH 2]. This may cause the electrical angle error as indicated by FIG. 4C.

$$A^{(0)} = \cos(\theta) + \sum_{k=2}^{\infty} a_k \cdot \cos(k \cdot \theta + \phi a_k) \quad \text{[MATH 3]}$$

$$B^{(0)} = \sin(\theta) + \sum_{k=2}^{\infty} b_k \cdot \sin(k \cdot \theta + \phi b_k)$$

where $a_k$ and $b_k$ denote harmonic component gains in the order k obtained when the amplitude of the first-order fundamental wave component is set to 1 in the single cycle as the single graduation. $\Phi a_k$ and $\Phi b_k$ denote the phase difference between the harmonic component in the order k and the fundamental wave component. The $a_k$, $b_k$, $\Phi a_k$, $\Phi b_k$ are invariable even in the case of the different graduation 103, or variable to the negligible degree. The $a_k$, $b_k$, $\Phi a_k$, $\Phi b_k$ are determined by characteristics and detection principle of the sensors 201a to 201i, and the scale 102. In the case of the sensors 201a to 201i of photodetector type, they are determined by reflection/transmission characteristics of the graduation pattern of the scale 102, and sensitivity characteristics of the light receiving portion. In the case of the sensors 201a to 201i formed as semiconductor magnetoresistance sensors, they are determined by the semiconductor magnetoresistance characteristics. When using the spur gear employed in the semiconductor magnetoresistance sensor for magnetic detection, they are determined by configuration characteristics of the gear teeth. As described above, the harmonic component contained in the output signal 204 differs depending on the type of the sensors 201a to 201i. Preferably, the sensors 201a to 201i are configured to output the output signal 204 that contains substantially the same fundamental wave component and the harmonic component. For example, the sensors 201a to 201i may be of the same type.

As described above, the angle error includes not only the electrical angle error owing to characteristics of the sensors 201a to 201i but also the mechanical angle error owing to the attachment accuracy of the rotary body 105, the quality of the scale 102, the secular change of the angle detector 101 and the like.

For the purpose of removing the electrical angle error owing to the characteristics of the sensors 201a to 201i, and the mechanical angle error owing to the attachment accuracy of the rotary body 105, the quality of the scale 102, the secular change of the angle detector 101 and the like, the angle detector 101 includes the scale 102 with the multiple graduations 103 along the circumference in the rotating direction 106 of the rotary body 105, and at least two of the sensors 201a to 201i disposed at the planned sensor locations 202a to 202i along the circumference in the rotating direction 106 of the rotary body 105. Additionally, as FIG. 3 shows, the controller 203 includes a signal processor 209 for executing the arithmetic operation of the output signals 204 from the sensors 201a to 201i.

The controller 203 may be configured to include an input unit 205 for acquiring the output signal 204 before execution of the arithmetic operation of the output signal 204 by the signal processor 209, a noise filter 206 for removing noise from the output signal 204, an amplifier 207 for amplifying the output signal 204, and an A/D converter 208 for converting the output signal 204 from an analog value into a digital value. The digitally converted output signal 204 is output to the signal processor 209. The controller 203 may be configured to include a storage unit 210 that allows the signal processor 209 to perform writing/reading of data. If the output signal 204 is a two-phase signal having two different phases, the signal processor 209 allows the inter-phase amplitude, the offset, and the phase difference to be adjustable. Even if those values are not adjusted, they are considered to become substantially the same so long as the respective signal characteristics of the sensors are at the same level. The present invention allows the electrical angle error to be removed.

One of the sensors 201a to 201i is set as a reference sensor (for example, the sensor 201a) so that an output signal difference between the output signal 204 from the reference sensor and the output signal 204 from each of the other sensors (for example, the sensors 201b to 201i) is obtained. An average value of the obtained output signal difference values derived from the other sensors is obtained so that a calibrated value for removing the mechanical angle error may be obtained. The actual angle change amount $X_p$ may be detected by adding/subtracting the calibrated value to/from the calculated temporary angle change amount $X_p^{(0)}$ of the rotary body 105. The angle detector 101 is self-calibrated with respect to the mechanical angle error. However, a mere arrangement of the sensors 201a to 201i along the rotating direction 106 of the rotary body 105 cannot remove the electrical angle error. The reason is that each of the output signals 204 from the sensors 201a to 201i contains the fundamental wave component having the single graduation of the multiple graduations 103 corresponding to the first order of one cycle, and the harmonic component having 2 or more integer multiples of the fundamental wave component as the order. The temporary angle change amount $X_p^{(0)}$ calculated from the output signal 204 contains at least one angle error component having the order component as the integer multiple of the single graduation of the graduations 103 corresponding to the first order of one cycle owing to one or more harmonic components of the output signal 204.

For the purpose of removing the electrical angle error owing to the characteristics of the sensors 201a to 201i, it is necessary to appropriately select the number of the sensors 201a to 201i to be disposed on the circumference 107 in the rotating direction 106 of the rotary body 105 based on the number of graduations N of the scale 102 along the circumference 107 in the rotating direction 106 of the rotary body 105, and the order p of the angle error component of the single graduation owing to the harmonic component contained in the output signal 204 from the sensors 201a to 201i. In this case, the order of the angle error component is the one contained in the angle error component. Assuming that the single graduation of the graduations 103 corresponds to the first order of one cycle, the order of the angle error component is the value as an integer multiple of the graduation. Referring to FIGS. 1A to 2B, for example, if the number of graduations of the scale 102 is 32, and the order of the angle error component of the single graduation owing to the harmonic component contained in the output signal 204 is p, the number of the sensors 201a to 201i to be disposed along the circumference 107 is selected based on the value 32 as the number of graduations of the scale 102, and the order p of the angle error component. The order p of the angle error component may be estimated, or determined in accordance with the calculation result of the angle error component on the circumference of the scale 102. Mostly, when the order p of the angle error component is equal to or smaller than 5, the electrical angle error notably appears. Alternatively, the harmonic component may be extracted from the output signal 204 from the sensors 201a to 201i preliminarily to determine the order p of the angle error component that needs to be removed. If the output signals 204 from the sensors 201a to 201i are input to the signal processor 209 via the input unit 205, the noise filter 206, the amplifier 207, the A/D converter 208 and the like, the harmonic component contained in the signal to be input to the signal processor 209 is extracted to allow appropriate selection of the number of the sensors 201a to 201i based on the order p of the angle error component that needs to be removed.

The temporary angle change amount $X_p^{(0)}$ calculated from the output signal 204 contains at least one angle error component each having the order component as an integer multiple of the single graduation of the graduations 103 corresponding to the first order of one cycle owing to one or more harmonic components contained in the output signal 204. The at least one angle error component may correspond to multiple angle error components. It is necessary to appropriately select the number of the sensors 201a to 201i to be disposed along the circumference 107 in the rotating direction 106 of the rotary body 105 based on the number of graduations N of the scale 102, and each order of the multiple angle error components. For example, the temporary angle change amount $X_p^{(0)}$ calculated from the output signal 204 contains two angle error components having the orders of 1, 2, that is, p=1, P=2 owing to one or more harmonic components of the output signal 204. In the condition as shown in FIGS. 1A to 2B, based on the number of graduations of the scale 102 set to 32, and the orders of two angle error components, that is, p=1, p=2, the number of the sensors 201a to 201i to be disposed along the circumference 107 in the rotating direction 106 of the rotary body 105 is selected.

The number of the sensors 201a to 201i may be determined based on the integer that cannot divide the product of the number of graduations N of the scale 102 and the order p of the angle error component of the single graduation. That is, the specific size or the like of the angle error component appears corresponding to the number of graduations on the circumference of the rotary body 105 while reflecting the individual difference. As the order p of the angle error component generated in the single graduation is kept uniform among the graduations, the electrical angle error on the circumference of the scale 102 is expressed by order $N_p$=N (the number of graduations of scale 102)×p (order of the angle error component in the single graduation). The number of the sensors 201a to 201i may be determined based on the integer that cannot divide the order $N_p$. This allows the sensors 201a to 201i to output the output signals 204 each with different phase. In other words, each of the sensors 201a to 201i outputs the output signal 204 that contains phases of the fundamental wave component and the harmonic component, which differ from one another.

Specifically, it is assumed that the number of graduations N of the graduations 103 formed on the scale 102 is 256, and the temporary angle change amount $X_p^{(0)}$ contains the angle error component with the component of the order p (1-10) of the single graduation owing to the harmonic component of the output signal 204. FIG. 5A shows determination results, specifically, the order $N_p$ of the electrical angle error on the circumference of the scale 102 is obtained by multiplication of the order p, and it is determined whether the order $N_p$ is divided by the integer (5 to 9) as the number of the planned sensor locations. If the order is divisible by the integer, it is marked X, and if the order is indivisible by the integers, it is marked ○. As the number of the planned sensor locations has more marks of ○, more electrical angle errors owing to the component of the order p may be removed. Referring to FIG. 5A, if the integer is 7 or 9, that is, the number of the planned sensor locations is 7 or 9, the number of marks of ○ becomes 9. This indicates that the electrical angle errors owing to many components of the order p can be removed. The sensors 201a to 201i are disposed at 7 or 9 of the planned sensor locations 202a to 202i, respectively. Meanwhile, if the integer is 8, that is, the number of the planned sensor locations is 8, the number of marks ○ is zero. This indicates that the electrical angle error cannot be removed. As the table shown in FIG. 5A is an example, the number of graduations of the graduations 103 formed on the scale 102, and the number of the planned sensor locations may be arbitrarily determined in a non-restricted manner.

Referring to FIGS. 1A, 2A, the planned sensor locations 202a to 202i are arranged at substantially equal intervals along the circumference 107 in the rotating direction 106 of the rotary body 105 by the number corresponding to the integer that cannot divide the order $N_p$ of the electrical angle error on the circumference of the scale 102. Referring to FIG. 5A, if the number of graduations N of the scale 102 is 256, the number of the planned sensor locations 202a to 202i becomes 7 or 9. It is therefore possible to arrange 7 or 9 planned sensor locations along the circumference 107 in the rotating direction 106 of the rotary body 105 at substantially equal intervals. Referring to FIGS. 1A, 2A, 9 planned sensor locations 202a to 202i are set along the circumference 107 in the rotating direction 106 of the rotary body 105. The sensors 201a to 201i are disposed at the planned sensor locations 202a to 202i, respectively. Referring to FIG. 1A, the sensors 201a, 201b are disposed at 2 (202a, 202b) of the 9 planned sensor locations 202a to 202i. Referring to FIG. 2A, the sensors 201a, 201b, 201d are disposed at 3 (202a, 202b, 202d) of the 9 planned sensor locations 202a to 202i. The correspondence relation between the sensors 201a to 201i and the planned sensor locations 202a to 202i is not restricted. For example, as FIG. 1A shows, each of the sensors 201a, 201b may be disposed at each of the two adjacently positioned planned sensor locations 202a, 202b among those from 202a to 202i. As FIGS. 1B, 2B show, each of the sensors 201a to 201i may be disposed at each corresponding planned sensor locations 202a to 202i, respectively.

The electrical angle error is expressed by order $N_p$=N (the number of graduations of scale 102)×p (order of angle error component of the single graduation). Generally, as values of N and p are integers, the value of $N_p$ becomes the integer as well. Actually, however, as the single graduation interval is uneven among those of the graduations 103 of the scale 102, execution of Fourier transform to the angle error on the circumference of the rotary body 105 corresponding to the first order of one cycle generates the spectral intensity observed as a crest shape around the integer order (for example, the spectral intensity of the order with a decimal point such as 2.9 and 3.1 around the spectral intensity with the order of 3). If the order $N_p$ of the electrical angle error on the circumference of the scale 102 is divided by the integer as the number of the planned sensor locations, a remainder is obtained. As the remainder (fraction) becomes larger, the number of the order $N_p$ of the electrical angle error that can be removed becomes larger. It is therefore possible to determine the number of the sensors 201a to 201i based on the remainder.

Specifically, similarly to FIG. 5A, it is assumed that the number of graduations N of the graduations 103 formed on the scale 102 is 256, and the temporary angle change amount $X_p^{(0)}$ contains the angle error component including the component of the order p (1 to 10) in the single graduation owing to the harmonic component of the output signal 204. On the assumption, the order $N_p$ of the electrical angle error on the circumference of the scale 102 is obtained by multiplication of the order p. When dividing the order $N_p$ by the integer (5 to 9) as the number of the planned sensor locations, the remainder is obtained. For example, if the remainder is smaller than 0.3, X is marked. If the remainder is equal to or larger than 0.3 and smaller than 0.7, ○ is marked. If the remainder is equal to or larger than 0.7, ◉ is marked. Depending on the remainder, weighting is performed (for example, 0 point for X, 1 point for ○, 2 points for ◉). FIG. 5B shows determination results of the number of the planned sensor locations with higher total score. The number of the planned sensor locations with higher total score is capable of removing more electrical angle errors with components of the order p. Referring to FIG. 5B, if the integer is 7 or 9, that is, the number of the planned sensor locations is 7 or 9, the total score results in 9 points. This allows many electrical angle errors with components of the order p to be removed. As FIGS. 1A to 2B show, the sensors 201a to 201i are disposed arbitrarily at the 9 planned sensor locations 202a to 202i, respectively. As described above, weighting is performed in accordance with the remainder derived from dividing the order $N_p$ of the electrical angle error on the circumference of the scale 102 by the integer as the number of the planned sensor locations. The number of the sensors 201a to 201i may be determined based on the weighting of the respective orders. If the angle error component of the single graduation owing to the harmonic component of the output signal 204 contains the order components in the second-order and fourth-order, that is, p=2, p=4, it is determined as ⊚. Accordingly, selection of 9 as the number of the planned sensor locations allows the electrical angle errors in the second-order and fourth-order to be removed. The sensors 201a to 201i are disposed at the 9 planned sensor locations 202a to 202i, respectively as shown in FIGS. 1A to 2B. As described above, the weighting is performed in accordance with the remainder derived from dividing the order $N_p$ of the electrical angle error on the circumference of the scale 102 by the integer as the number of the planned sensor locations. Based on the weighting in accordance with the remainder, the number of the sensors 201a to 201i may be determined.

It is possible to select the number of graduations N of the graduations 103 formed on the scale 102 after determination of the number of the planned sensor locations. Specifically, it is assumed that the number of the planned sensor locations is 5, and the number of graduations N of the graduations 103 formed on the scale 102 is 254 to 259. It is further assumed that the temporary angle change amount $X_p^{(0)}$ contains the angle error components with components of the order p (1 to 10) of the single graduation owing to the harmonic component of the output signal 204. On the assumption, the order $N_p$ of the electrical angle error on the circumference of the scale 102 is obtained by multiplication of the order p, and the order $N_p$ is divided by 5 as the number of the planned sensor locations. If the remainder is smaller than 0.3, X is marked. If the remainder is equal to or larger than 0.3 and smaller than 0.7, ○ is marked. If the remainder is equal to or larger than 0.7, ⊚ is marked. Depending on the remainder, weighting is performed (for example, 0 point for X, 1 point for ○, 2 points for ⊚). FIG. 5C shows determination results of the number of graduations N on the circumference of the scale 102. The one with higher total score is capable of removing more electrical angle errors with the orders p. Referring to FIG. 5C, except that the number of graduations N on the circumference of the scale 102 is 255, the electrical angle errors with substantially the equivalent number of orders p may be removed. The sensors 201a to 201i are disposed at any of the 5 planned sensor locations 202a to 202e, respectively. The determination result of the number of graduations N on the circumference of the scale 102 exhibits repeatability by the number of the planned sensor locations. For example, in the condition where the number of the planned sensor locations is set to 5, the determination results become the same when the number of graduations N on the circumference of the scale 102 is 254±(5×integer multiple)(In FIG. 5C, the determination results become the same when the number N is set to 254 and 259). As described above, the determination result exhibits repeatability by the number of the planned sensor locations irrespective of the number of the graduations N on the circumference of the scale 102.

The number of graduations N of the graduations 103 formed on the scale 102, the order p of the angle error component estimated or preliminarily confirmed from the harmonic component contained in the output signal 204, and the number of the planned sensor locations are obtained. As FIGS. 1A to 2B show, the sensors 201a to 201i are disposed at the planned sensor locations 202a to 202i, respectively. One of the output signals 204 from the sensors 201a to 201i is set as the reference sensor (for example, the sensor 201a) so that an output signal difference between the output signal 204 from the reference sensor and the output signal 204 from each of the other sensors (for example, the sensors 201b to 201i) is obtained. An average value of the obtained values of the output signal difference from the other sensors is obtained so that a calibrated value for removing not only the mechanical angle error but also the electrical angle error may be obtained. The actual angle change amount $X_p$ may be detected by adding/subtracting the calibrated value to/from the calculated temporary angle change amount $X_p^{(0)}$ of the rotary body 105. The angle detector 101 is self-calibrated with respect to the angle error including the mechanical angle error and the electrical angle error. The calibrated angle change amount $X_p$ may be set as the detection value of the angle detector 101, or transmitted to the motor for driving the rotary body 105, the control unit of the rotary body 105 and the like as feedback so that such information may be used as a reference angle. The calibrated value may be obtained by executing the arithmetic operation for each timing when the output signals 204 from the sensors 201a to 201i are input to the signal processor 209 upon rotation of the rotary body 105. Alternatively, the arithmetic operation of the calibrated values on the circumference of the rotary body 105 is preliminarily executed by the signal processor 209 so that the resultant data are stored in the storage unit 210 as a correction table, and read therefrom upon rotation of the rotary body 105.

Figure 6A:
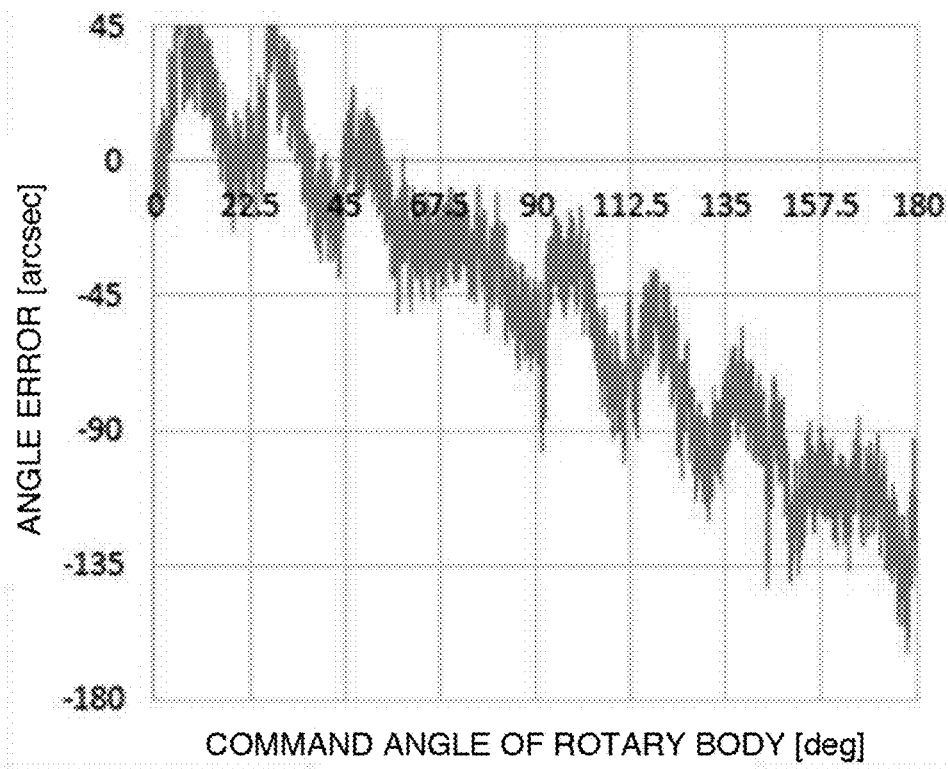
Figure 6B:
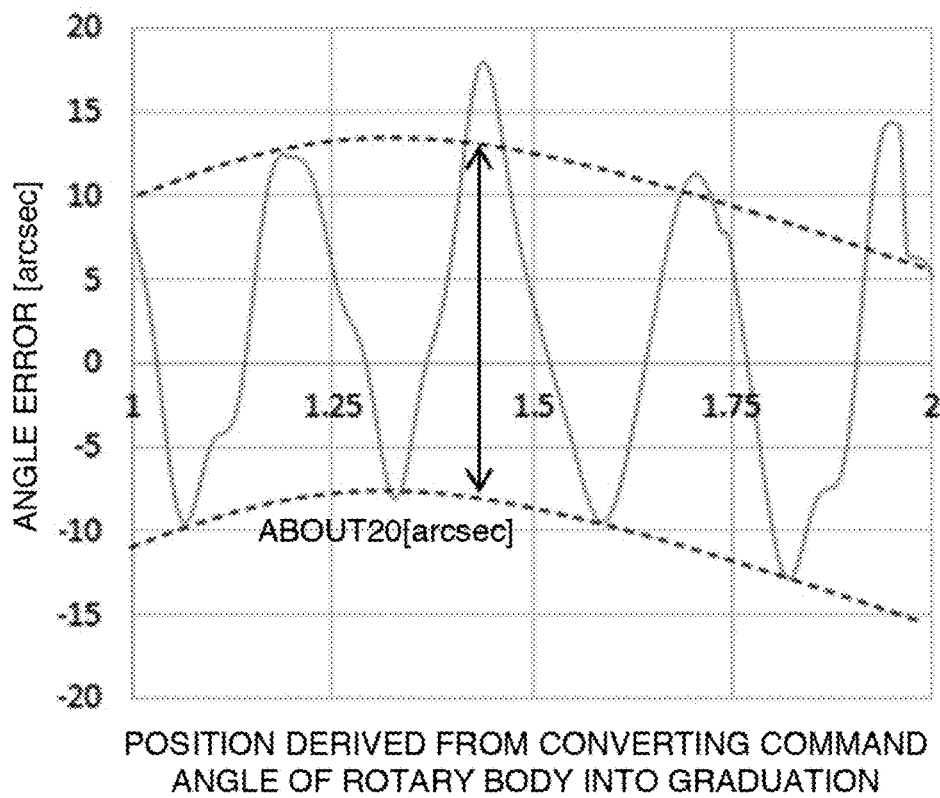
FIG. 6B is a partially enlarged view of FIG. 6A in the case where the command angle of the rotary body is converted into the graduation.
Figure 6C:
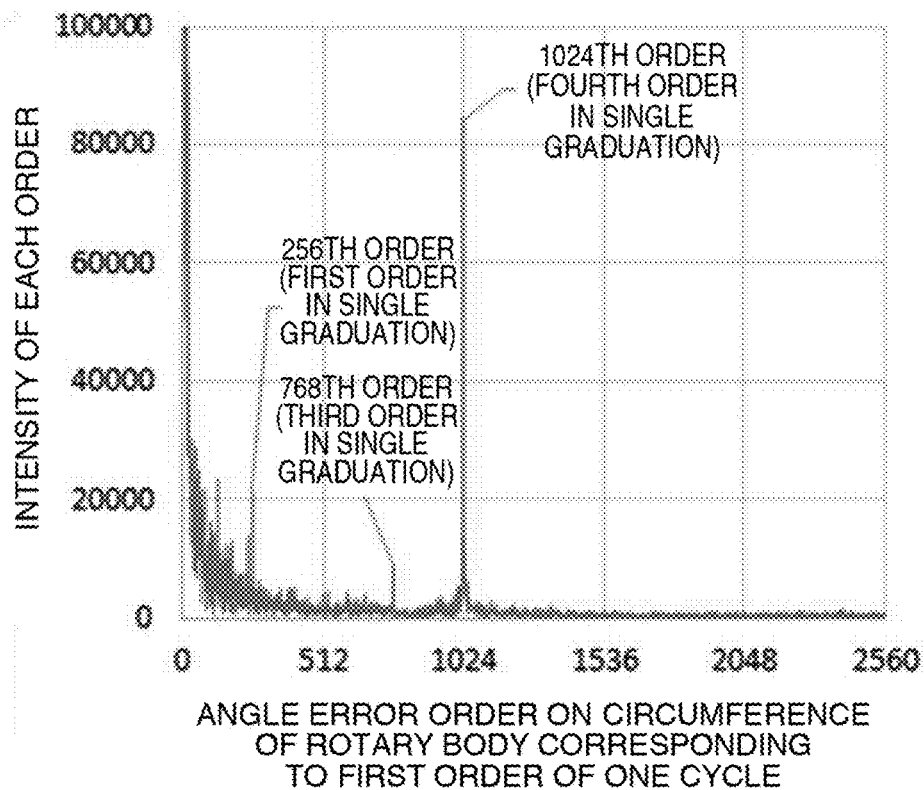
FIG. 6C shows the spectral intensity derived from execution of Fourier transform to the angle error before removing the electrical angle error owing to the sensor and the mechanical angle error owing to the attachment accuracy of the rotary body and the like in the condition where a circumference of the rotary body corresponds to the first order of one cycle.

FIGS. 6A to 6C show an angle error to a command angle of the rotary body 105, which has been calculated by the signal processor 209 based on the output signal 204 only from the sensor 201a of the angle detector 101 as shown in FIG. 1B before removing the angle error including the mechanical angle error and the electrical angle error, a partially enlarged angle error to the command angle in the single graduation of the rotary body 105, and the spectral intensity derived from execution of Fourier transform to the angle error on the circumference of the rotary body 105 corresponding to the first order of one cycle. The angle error owing to the component in the long cycle (small order) to the command angle is the mechanical angle error. Referring to FIG. 6A, in the angle detector 101, the mechanical angle error is constituted by the angle error as the main component on the circumference of the rotary body 105 corresponds to the first order of one cycle, and has a width of approximately 180 arcsec. FIG. 6A shows measurement results of the range from 0 to 180 deg., which has been extracted from the measurement range from 0 to 360 deg. The angle error owing to the component in the short cycle (large order) to the command angle is the electrical angle error. Referring to FIG. 6B, the electrical angle error is constituted by the angle error as the main component in the 1024th order (order p=fourth in the single graduation), and has the width of approximately 20 arcsec. As the total number of graduations of the scale 102 is 256, and the angle interval 104 of the single graduation is 1.406 deg., the width of 20 arcsec. as the electrical angle error corresponds to approximately 0.4% of the interval. Referring to FIG. 6C, high spectral intensity is observed around the angle error order components in the 256th order (1 graduation in the first order), 768th order (1 graduation in the third order), and 1024th order (1 graduation in the fourth order), and significantly high spectral intensity is observed around the angle error order component in the 1024th order (1 graduation in the fourth order).

Figure 7A:
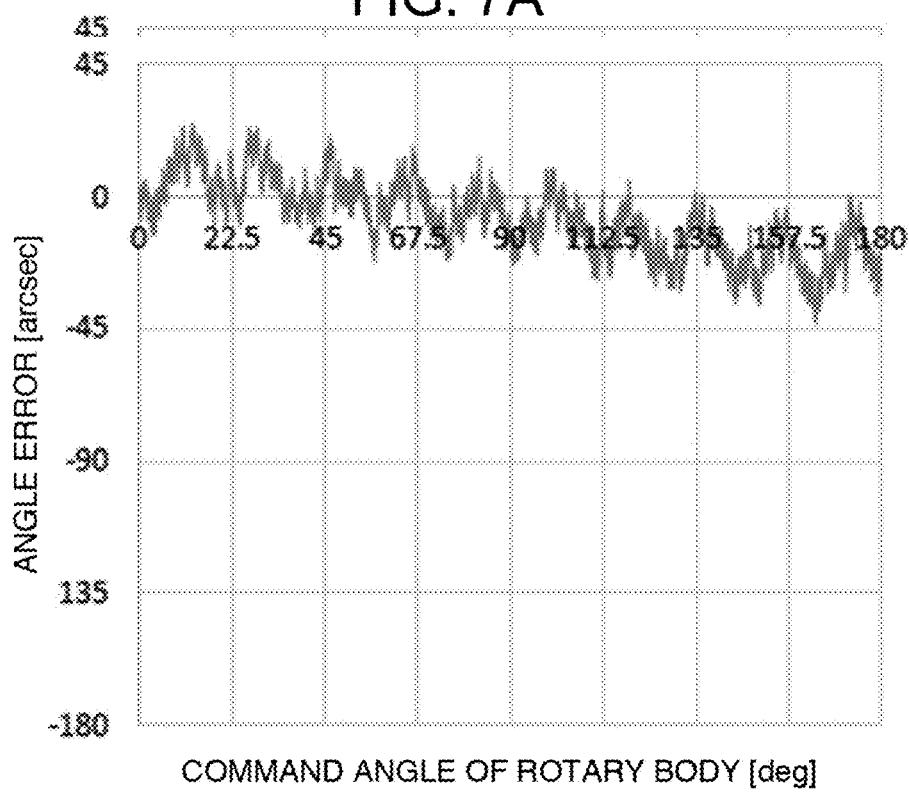
Figure 7B:
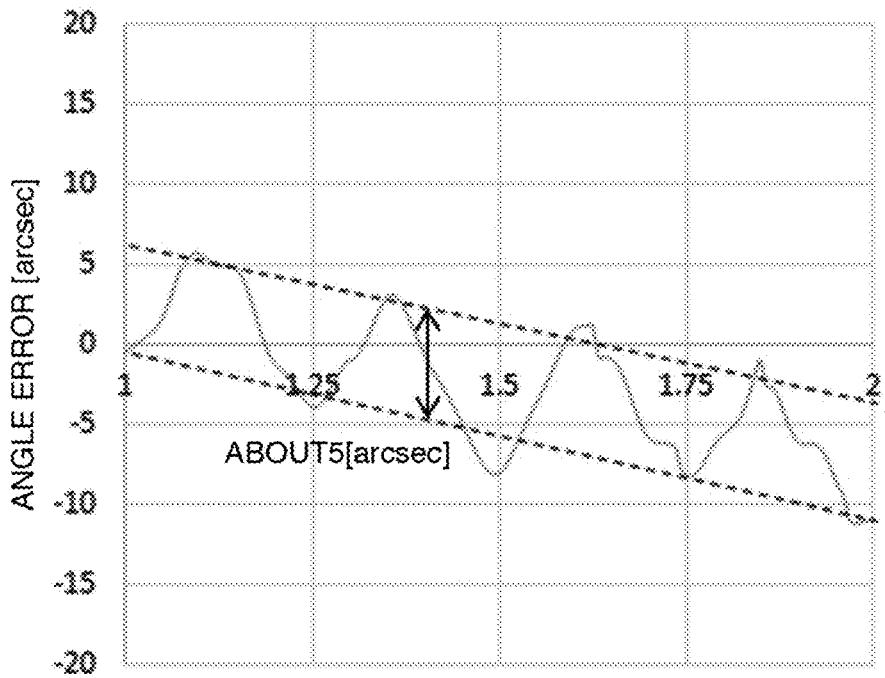
FIG. 7B is a partially enlarged view of FIG. 7A in the case where the command angle of the rotary body is converted into the graduation.
Figure 7C:
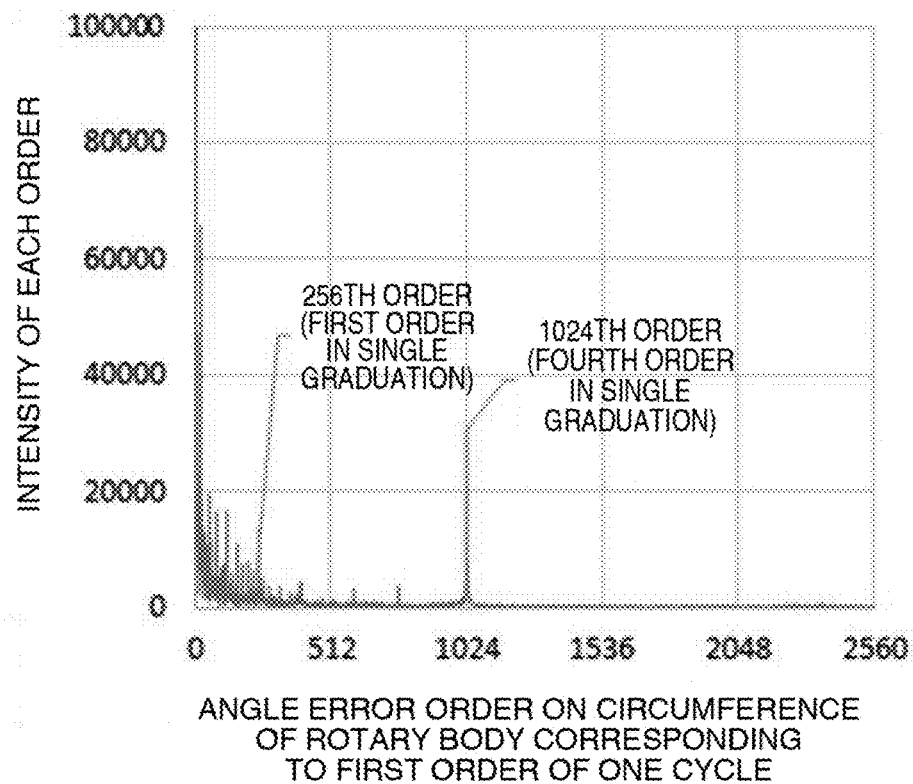
FIG. 7C shows the spectral intensity derived from execution of Fourier transform to the angle error after removing the electrical angle error owing to the sensor and the mechanical angle error owing to the attachment accuracy of the rotary body in the condition where a circumference of the rotary body corresponds to the first order of one cycle.

FIGS. 7A to 7C show an angle error to the command angle of the rotary body 105, which has been calculated by the signal processor 209 based on the output signals 204 from the sensors 201a to 201i of the angle detector 101 as shown in FIG. 1B after removing the angle error including the mechanical angle error and the electrical angle error, a partially enlarged angle error to the command angle in the single graduation of the rotary body 105, and the spectral intensity derived from execution of Fourier transform to the angle error on the circumference of the rotary body 105 corresponding to the first order of one cycle. As the number of the planned sensor locations (the number of the disposed sensors) is 9, it is possible to remove the angle error including the mechanical angle error and the electrical angle error of the order $N_p$ which is indivisible by 9. Referring to FIG. 7A, the mechanical angle error constituted by the main component in the first order, which is indivisible by 9 may be reduced to the width of approximately 45 arcsec. FIG. 7A shows the measurement result of the range from 0 to 180 deg., which has been extracted from the measured range from 0 to 360 deg. Referring to FIG. 7B, the electrical angle error constituted by the main component in the 1024th order that is indivisible by 9 may be reduced to the width of approximately 5 arcsec. (approximately 0.1% of 1.406 deg. as the angle interval 104 of the single graduation). As described above, it is possible to reduce the angle error including the mechanical angle error and the electrical angle error by substantially a quarter. Referring to FIG. 7C, it is possible to largely lower the spectral intensity of the order components of the angle error in the 256th order (the order p=first order of 1 graduation), 768th order (third order of 1 graduation), and the 1024th order (fourth order of 1 graduation). Referring to FIG. 7A, 10 crest-shaped components (component in the 20th order on the circumference of the rotary body 105 corresponding to the first order of one cycle) generated in the command angle of 180 deg. of the rotary body 105 are known each as the angle error owing to the mechanical characteristics of the rotary body 105 in use. FIGS. 7A to 7C indicate that the use of the present invention removes the mechanical angle error and the electrical angle error from the temporary angle change amount $X_p^{(0)}$ calculated from the output signal 204 so that the actual angle change amount $X_p$ of the rotary body 105 and the angle error may be detected highly accurately.

It should be further understood by those skilled in the art that although the foregoing description has been made on embodiments of the present invention, the present invention is not limited thereto and various changes and modifications may be made without departing from the spirit of the present invention and the scope of the appended claims.

REFERENCE SIGNS LIST 101 angle detector
102 scale
103 graduation
104 angle interval of single graduation
105 rotary body
106 rotating direction
107 circumference
108 rotary axis
201a-201i sensor
202a-202i planned sensor location
203 controller
204 output signal
205 input unit
206 noise filter
207 amplifier
208 A/D converter
209 signal processor
210 storage unit
211 display device

The invention claimed is:

1. An angle detector including a rotary body rotating around a rotary axis, a scale with multiple graduations along a circumference of the rotary body in a rotating direction, and at least two sensors disposed along the circumference, the angle detector detecting an angle change amount of the rotary body in rotation, wherein:

each of the at least two sensors outputs a signal in accordance with the angle change amount based on the multiple graduations;

the output signal contains a fundamental wave component where one graduation of the multiple graduations is set as a first order of one cycle, and a harmonic component where two or more integer multiples of the fundamental wave component is set as an order, and the angular change amount calculated from the output signal contains at least one angle error component having an order component of an integer multiple of the one graduation set as the first order of the one cycle owing to the harmonic component;

the number of the at least two sensors is determined based on the number of the graduations of the scale, and the order component of the at least one angle error component; and the number of the at least two sensors is determined based on an integer incapable of dividing a product of the number of the graduations of the scale and one or more integer being the order component of the at least one angle error component.

2. The angle detector according to claim 1, wherein the at least one angle error component corresponds to multiple angle error components, and the number of the at least two sensors is determined based on the number of the graduations of the scale, and each of the order components of the multiple angle error components.

3. The angle detector according to claim 1, wherein the number of the at least two sensors is further determined based on a remainder derived from dividing the product by the integer incapable of dividing the product.

4. The angle detector according to claim 3, wherein the number of the at least two sensors is determined based on a weighting in accordance with the remainder.

5. The angle detector according to claim 1, wherein planned sensor locations by the number that coincides with the integer incapable of dividing the product are set along the circumference at substantially equal intervals, and the at least two sensors are disposed one by one at any of the planned sensor locations.

6. The angle detector according to claim 5, wherein two of the at least two sensors are disposed one by one at adjacent two of the planned sensor locations.

7. The angle detector according to claim 5, wherein each one of the at least two sensors is disposed one by one at each one of the planned sensor locations.

8. The angle detector according to claim 1, wherein the at least one angle error component differs with a type of the at least two sensors.

9. The angle detector according to claim 1, wherein self-calibration is performed by obtaining an output signal difference between the output signal from one of the at least two sensors and the output signal from the other sensor.

\* \* \* \* \*